United States Patent

[11] 3,543,934

| [72] | Inventor | Robert E. Raymond<br>Zanesville, Ohio |
|------|----------|---------------------------------------|
| [21] | Appl. No. | 760,426 |
| [22] | Filed | Sept. 18, 1968 |
| [45] | Patented | Dec. 1, 1970 |
| [73] | Assignee | International Basic Economy Corporation<br>New York, New York<br>a corporation of New York |

[54] HYDRAULIC RESERVOIR AND FILTER APPARATUS
2 Claims, 3 Drawing Figs.

[52] U.S. Cl. .................................................. 210/90,
210/172, 210/232
[51] Int. Cl. .................................................. B01d 35/14
[50] Field of Search .......................................... 210/90,
172, 232, (Rosaen Digest)

[56] References Cited
UNITED STATES PATENTS

| 1,817,572 | 8/1931 | Linley et al. ................... | 210/172 |
| 2,811,218 | 10/1957 | Winslow ........................ | 210/172X |
| 3,313,417 | 4/1967 | Rosaen .......................... | 210/172X |
| 3,441,138 | 4/1969 | Rosaen et al. .................. | 210/172X |
| 3,464,556 | 9/1969 | Cullen .......................... | 210/90 |

*Primary Examiner*—Samih N. Zaharna
*Attorney*—Schmieding and Fultz

ABSTRACT: A hydraulic machine that includes a reservoir for hydraulic fluid and a filter and filter condition indicator apparatus for said fluid. The filter and filter condition indicator apparatus include a tube portion which is extended through a wall of the reservoir so as to be removable therefrom as an assembly and the tube portion is arranged to serve the dual function of a vacuum transmitting column to a pressure gauge as well as a force transmitting structural member which maintains portions of the apparatus in sealed engagement with one another.

Patented Dec. 1, 1970

3,543,934

INVENTOR.
ROBERT E. RAYMOND

BY
Schmieding & Fultz

ATTORNEYS

INVENTOR.
ROBERT E. RAYMOND

HYDRAULIC RESERVOIR AND FILTER APPARATUS

This invention relates generally to reservoirs for a hydraulic machine and more particularly to such a device that includes a filter and filter condition indicator apparatus.

In general, the apparatus of the present invention is in the form of an assembly that is combined with a hydraulic reservoir for supplying and receiving hydraulic fluid from a system, the top wall of said reservoir being provided with an access opening for removal of said assembly as a unit.

The filter assembly includes a tube portion which is extended through a wall of the reservoir and provided with a vacuum gauge or other indicator that is responsive to the pressure within said tube portion so as to indicate when the filter element should be serviced.

The apparatus further includes a housing portion mounted on the bottom of said tube and disposed in the hydraulic fluid in the reservoir. The lower end of the housing includes an annular shoulder surrounding a housing outlet port adapted to engage a second annular shoulder forming a seal that surrounds a reservoir outlet port through a wall of said reservoir.

It should be next mentioned that the tube portion includes adjustable mounting means on the top reservoir wall for urging said annular shoulders together. It will now be understood that the tube portion serves the dual function of a vacuum transmitting column to the gauge and a force transmitting structural member which maintains said annular shoulders in sealed engagement with one another.

The filter assembly further includes a filter element having an inner surface exposed to the interior of said tube portion and an outer surface exposed in the hydraulic fluid within the reservoir such that pump suction from the external hydraulic system draws fluid through the filter element and thence through the reservoir port back to the system. However, as the flow of fluid through the filter media is subjected to resistance, due to the build up of filtered particles, a resulting pressure drop develops within the previously mentioned tube portion. This results in a corresponding indication on the vacuum gauge thereby showing the operator that the filter should be changed or serviced.

As another aspect of the present invention, the components of the above mentioned filter assembly are arranged so as to be of lesser diameter than the access opening through the reservoir wall such that the components thereof can be readily removed from and reinstalled in the reservoir as an assembly.

As still another aspect of the present invention the above mentioned tube portion of the apparatus being extended through the access opening in the reservoir wall, is provided with an axially adjustable collar which can be selectively positioned at various locations along said tube portion thereby adapting the apparatus for precise adjustment as a force transmitting member for the above mentioned seals. Also, said adjustable collar serves to make the apparatus adaptable for use with reservoirs of various depths.

It is therefor an object of the present invention to provide a filter assembly and reservoir which include disengageable annular seals and a tube portion that transmits force to said seals, said components being arranged such that the tube portion serves the dual functions of a pressure indicating column and a force transmitting member for said annular seals.

It is another object of the present invention to provide a filter assembly that can be standardized for use with reservoirs of various depths and capacities.

Further objects and advantages of the present invention will be apparent from the following description, reference being had to the accompanying drawings wherein a preferred form of embodiment of the invention is clearly shown.

IN THE DRAWINGS

Figure 2:
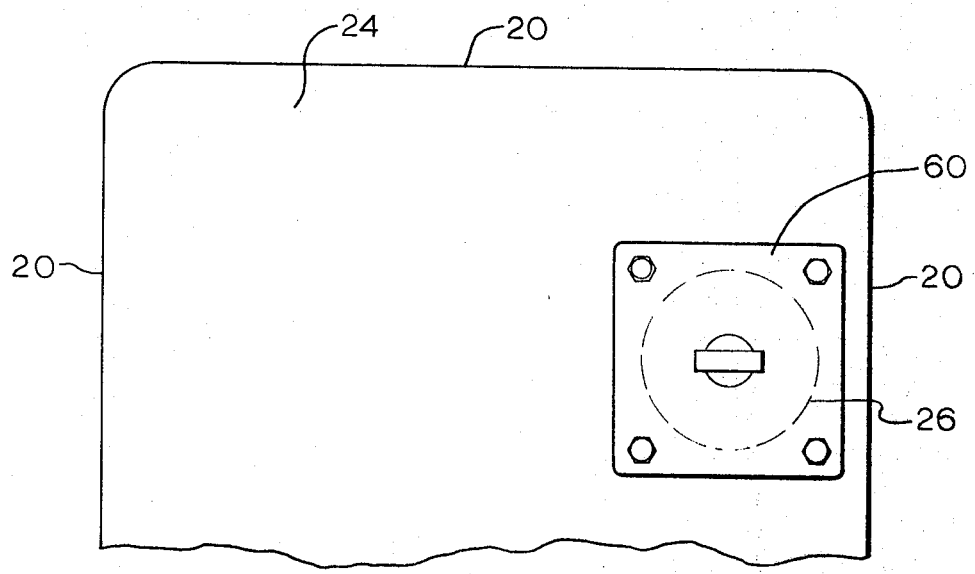
FIG. 2 is a top elevational view of the apparatus of FIG. 1.
Figure 1:
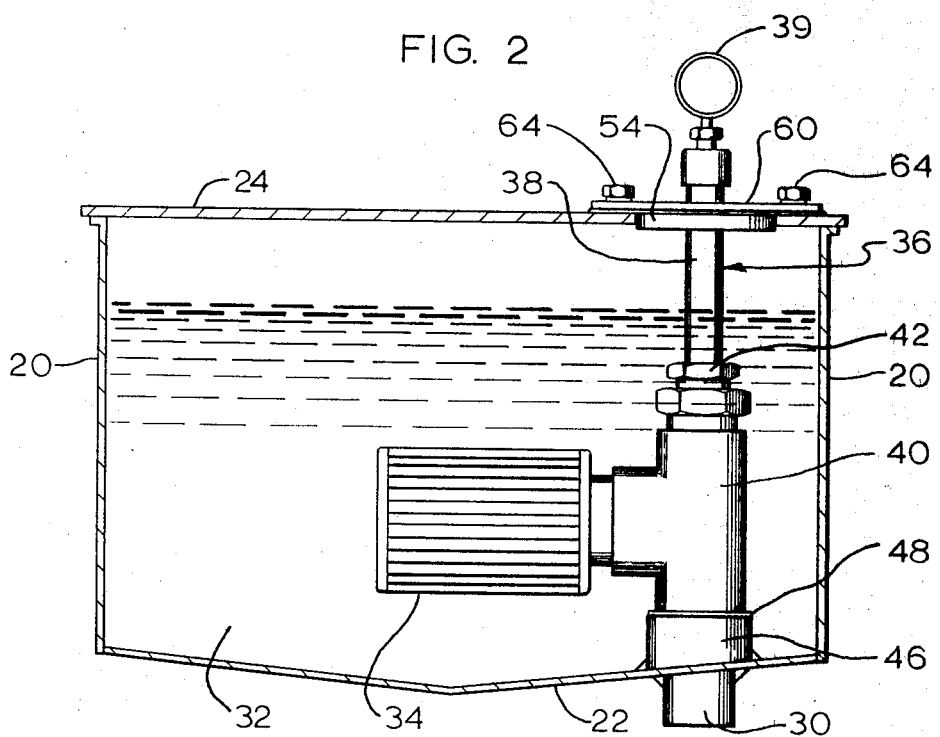
FIG. 1 is a side sectional view of a hydraulic reservoir and filter assembly constructed in accordance with the present invention.

Referring in detail to the drawings, FIGS. 1 and 2 illustrate a reservoir for a hydraulic machine or system which includes sidewalls 20, a bottom wall 22, and a top wall 24 provided with an access opening 26.

As seen in FIG. 1 bottom wall 22 of the reservoir includes a port 30 for the flow of hydraulic fluid through the reservoir which port is connected with the suction side of a hydraulic pump, not illustrated, whereby fluid from a bath 32 is drawn through a filter element 34.

Figure 3:
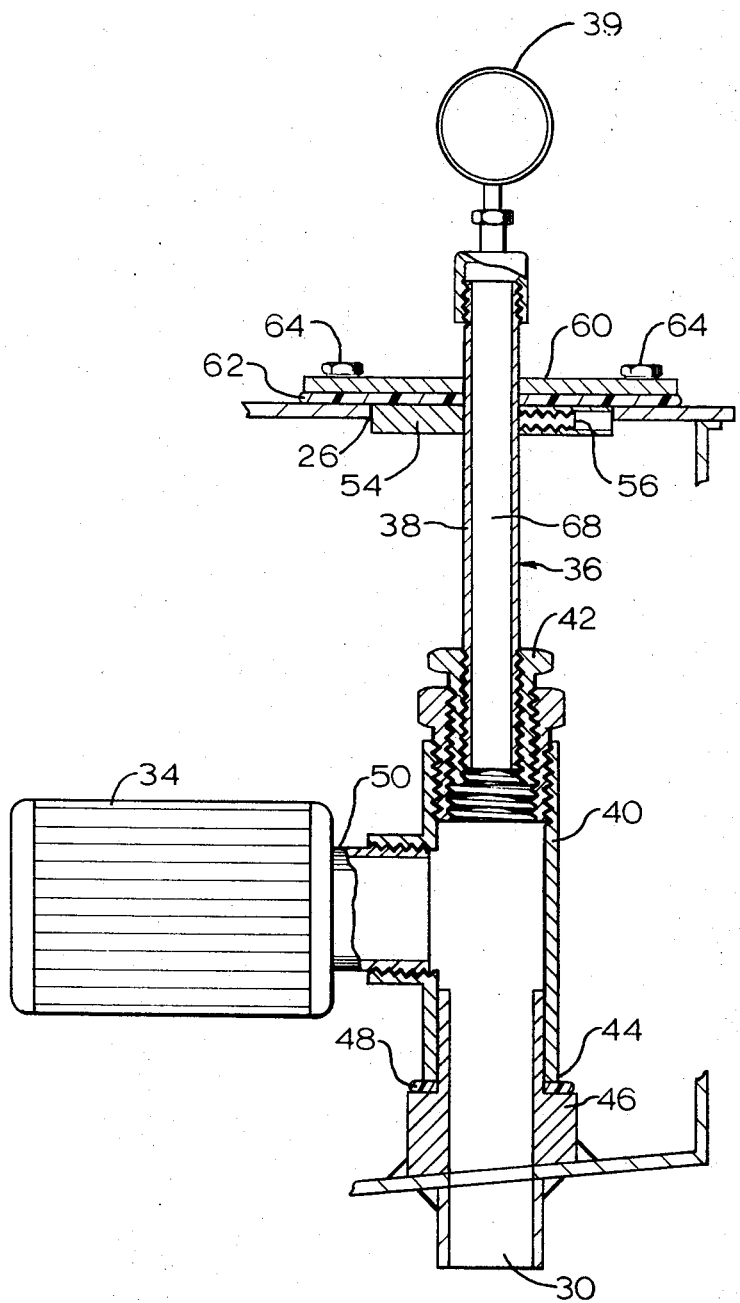
FIG. 3 is an enlarged sectional view of the filter assembly of the preceding figures.

With continued reference to FIGS. 1 and 3, the apparatus further includes a filter and condition indicator assembly indicated generally at 36 which includes a tube portion 38 on the upper end of which is mounted pressure indicating indicia such as a vacuum gauge 39. The lower end of tube portion 38 is connected to a housing portion 40 at a coupling 42, and the lower end of said housing portion includes an annular shoulder 44 which confronts a second annular shoulder 46 carried by lower reservoir wall 22 and in surrounding relationship with port 30.

A resilient seal or gasket 48 is disposed between shoulder 44 on housing 40 and the confronting shoulder 46 carried by the reservoir wall.

With continued reference to FIGS. 2 and 3, housing 40 includes a horizontally extending filter mounting portion 50 on the end of which is removably mounted a cylindrical filter element 34.

As is best seen in FIG. 3, tube portion 38 of the filter and condition indicator assembly carries an axially adjustable collar 54 provided with a set screw 56. Such collar can be selectively released for axial movement and reclamped, by loosening and tightening set screw 56, so that collar 54 can be positioned at various axial locations along tube portion 38. This adapts the assembly for use with reservoirs of various depths.

With continued reference to FIGS. 1 and 3, a clamp plate 60 and an air seal gasket 62 are disposed in overlying relationship with collar 26 such that when a plurality of bolts 64 are tightened, clamp plate 60 urges air seal gasket 62 into sealed engagement with top wall 24 of the reservoir and also in sealed engagement with axially adjustable collar 54.

It is important to note that the tightening of bolts 64 also serves to apply axial force to collar 54 which in turn forces tube 38 downwardly hence urging shoulder 44 on the lower end of housing 40 into sealed engagement with an oil seal gasket 48 and the underlying shoulder 46 which surrounds port 30.

In view of the above it will be noted that the tube portion 38 of the filter assembly serves the dual function of providing a passage 68 for transmitting pressure to gauge 39, and forming a structural member for urging lower shoulder 44 into sealed engagement with underlying resilient oil seal 48.

In operation, when it is desired to remove the filter and condition indicator assembly 36, for example when filter element 34 becomes partially clogged as indicated by vacuum gauge 39, then the bolts 64 are removed and the filter assembly 36 together with clamp plate 60 and gasket 62, is lifted upwardly and outwardly through access opening 26, it being understood that the tubular portion 38 must be tilted from the vertical so as to permit removal of the L-shaped assembly. including the filter 34 whereby the filter or any portion of the assembly can be serviced.

I claim:

1. A reservoir and filter apparatus for a hydraulic machine comprising, in combination, reservoir means including reservoir walls provided with a filter access opening and a reservoir port for connection with the flow of hydraulic fluid through said reservoir, and said port including a first peripheral shoulder; a filter and filter condition indicator assembly comprising housing means including a tube portion extended through said access opening to the exterior of said reservoir means, indicator means communicating with the interior of said tube portion and responsive to the pressure therein, filter means mounted on said housing means and including a first filter surface communicating with the interior of said reservoir means and second filter surface communicating with the interior of said tube portion, a second port in said housing means and including a second peripheral shoulder in detachable sealed relationship with said first peripheral shoulder of said reservoir port and mounting means connecting said assembly with said reservoir means, said mounting means including an adjustable collar movable to various positions along said tube portion and in force transmitting relationship between one of said reservoir walls and said tube portion for urging said shoulders into sealed relationship with one another, the components of said filter and filter condition indicator assembly being of lesser diameter than said access opening whereby said components can be removed from said reservoir means in assembled relationship.

2. A reservoir and filter apparatus for a hydraulic machine comprising, in combination, reservoir means including a first wall provided with an access opening and a second wall opposite said first wall and provided with a port for the flow through said reservoir and a first peripheral shoulder surrounding said port; a filter and condition indicator assembly including a tubular housing comprising a main conduit portion provided with a first end having a second peripheral shoulder that engages and seals with said first peripheral shoulder of said second wall of said reservoir means to provide a seal between said main conduit portion and said port, a second end that extends outwardly of said access opening. A branch conduit positioned between said first and second ends, filter means mounted on said branch conduit and having a first filter surface communicating with the interior of the reservoir and a second surface communicating with said first and second ends, filter condition indicating means mounted on said second end, said filter and condition indicator assembly being removable as an assembly from said access opening; and means operative between said first wall and first end of said assembly for urging said second peripheral shoulder of said assembly into sealed engagement with said first peripheral shoulder at said port of said second wall.